(12) United States Patent
Chandra et al.

(10) Patent No.: US 6,868,299 B2
(45) Date of Patent: Mar. 15, 2005

(54) GENERATING A SAMPLING PLAN FOR TESTING GENERATED CONTENT

(75) Inventors: M. H. Keerthi Chandra, Bangalore (IN); Ajosh Jose, Ernakulam (IN); Mahesh Khande Rao, Bangalore (IN)

(73) Assignee: i2 Technologies US, Inc., Dallas, TX (US)

( * ) Notice: Subject to any disclaimer, the term of this patent is extended or adjusted under 35 U.S.C. 154(b) by 0 days.

(21) Appl. No.: 10/414,892

(22) Filed: Apr. 15, 2003

(65) Prior Publication Data

US 2004/0210335 A1 Oct. 21, 2004

(51) Int. Cl.⁷ .............................................. G06F 19/00
(52) U.S. Cl. ........................ 700/109; 700/28; 700/108
(58) Field of Search ............................. 700/28, 33, 90, 700/95, 108, 109; 705/1, 7, 8

(56) References Cited

U.S. PATENT DOCUMENTS 5,327,437 A * 7/1994 Balzer ........................ 714/736
5,717,607 A * 2/1998 Hu .............................. 702/123
5,987,398 A * 11/1999 Halverson et al. .......... 702/179
6,434,511 B1 * 8/2002 Stein et al. .................. 702/179
6,477,432 B1 * 11/2002 Chen et al. .................... 700/51
6,711,514 B1 * 3/2004 Bibbee ......................... 702/84

* cited by examiner

Primary Examiner—Jayprakash N. Gandhi
(74) Attorney, Agent, or Firm—Baker Botts L.L.P.

(57) ABSTRACT

In one embodiment, method for generating a sampling plan for testing generated content includes generating input. The input is usable to generate a sampling plan for testing a lot. The input includes information reflecting a size of the lot, information reflecting a minimum level of lot quality that a consumer can tolerate, information reflecting a probability that the lot will not meet the minimum level of lot quality that the consumer can tolerate, and information reflecting one or more constraints that have historically affected lot quality. The method includes, according to the received input and a distribution function corresponding to the size of the lot, generating a sampling plan specifying a sample size and one or more acceptance criteria and generating information for evaluating the effectiveness and efficiency of the generated sampling plan.

29 Claims, 2 Drawing Sheets

//GENERATING A SAMPLING PLAN FOR TESTING GENERATED CONTENT

TECHNICAL FIELD OF THE INVENTION

This invention relates generally to testing generated content and more particularly to generating a sampling plan for testing generated content.

BACKGROUND OF THE INVENTION

Content is typically generated using one or more processes according to which one or more persons manually enter data. As a result of human error or error in the processes used to generate content, generated content often contains errors that can hinder use of the content. For example, errors in generated content used for searching for items matching certain buyer specifications could result in false positives, false negatives, or both being returned as search results, which could undermine the usefulness of the search. Process control methods can be used to reduce the occurrence of errors in generated content, identify process improvements, and assess the quality of generated content deliverable to a consumer. One or more sampling plans can also be used to reduce the occurrence of errors in generated content, identify process improvements, and assess the quality of generated content deliverable to a consumer. According to a sampling plan, a subset of content units is drawn from a set of content units and tested. If the subset meets one or more acceptance criteria, the set from which the subset has been drawn is deemed acceptable. If the subset does not meet the acceptance criteria, the set is deemed unacceptable. MIL-STD-105, MIL-STD-1916, and other standards that can be used to generate sampling plans are unsuitable for many content testing environments.

SUMMARY OF THE INVENTION

Particular embodiments of the present invention may reduce or eliminate disadvantages and problems traditionally associated with sampling plans.

In one embodiment, a method for generating a sampling plan for testing generated content includes generating input. The input is usable to generate a sampling plan for testing a lot. The input includes information reflecting a size of the lot, information reflecting a minimum level of lot quality that a consumer can tolerate, information reflecting a probability that the lot will not meet the minimum level of lot quality that the consumer can tolerate, and information reflecting one or more constraints that have historically affected lot quality. The method includes, according to the received input and a distribution function corresponding to the size of the lot, generating a sampling plan specifying a sample size and one or more acceptance criteria and generating information for evaluating the effectiveness and efficiency of the generated sampling plan.

Particular embodiments of the present invention may provide one or more technical advantages. Particular embodiments can generate a sampling plan for testing a lot and provide information that can be used to evaluate the efficiency and effectiveness of the sampling plan. Particular embodiments can generate a sampling plan for testing a lot that takes into account one or more constraints that have affected lot quality in the past, such as the competency level of the personnel generating the product, the complexity of the product, the quality of the data source used to generate the product, and other constraints. Particular embodiments can generate a sampling plan for testing a lot that takes into account an error history associated with the lot. Particular embodiments can generate a sampling plan for a lot that takes into account the size of the lot. Particular embodiments can generate sampling plans that are dynamic with respect to one or more constraints that could affect lot quality, such as the competency level of the personnel generating the product, the complexity of the product, the quality of the data source used to generate the product, and other constraints.

Certain embodiments may provide all, some, or none of these technical advantages. Certain embodiments may provide one or more other technical advantages, one or more of which may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description, taken in conjunction with the accompanying drawings, in which.

DESCRIPTION OF EXAMPLE EMBODIMENTS

Figure 1:
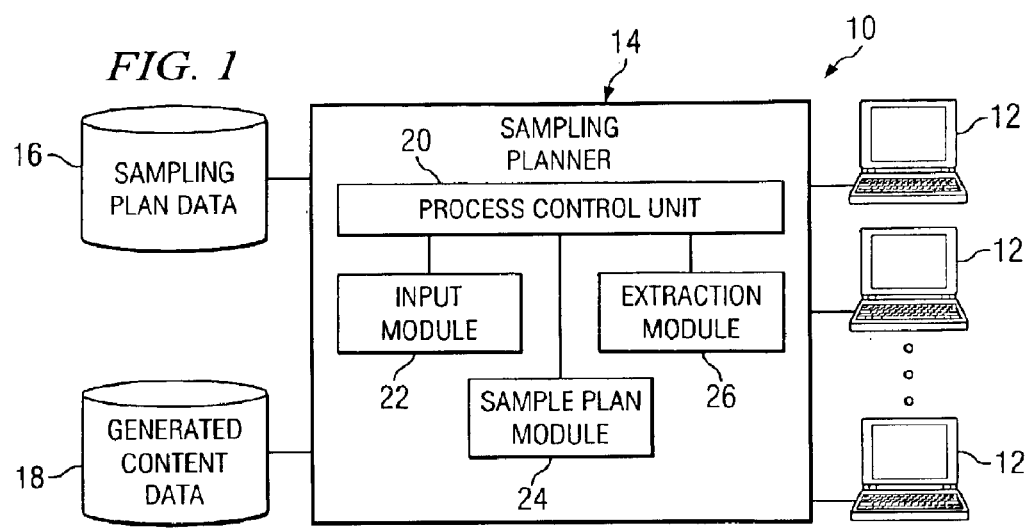
FIG. 1 illustrates an example system for generating a sampling plan for testing generated content.

FIG. 1 illustrates an example system 10 for generating a sampling plan for testing generated content. Reference to "content" encompasses any suitable recorded information. As an example, content could be recorded information about items (which includes tangible and intangible things, services, and other items) that could be used describe one or more items, search for one or more items, compare items with each other, or buy or sell one or more items. This includes commerce content (which is content providing a commercial description of an item, which could include item number, item price, and item availability) and technical content (which is content describing the technical attributes of an item that indicate whether the item is fit for certain purposes, which could include item size, item shape, item configuration, and other item variables). As another example, content could be recorded information reflecting compiled knowledge regarding business functions and processes. As another example, content could be software or other recorded instructions executable by a computer system. As another example, content could be recorded information regarding patient medical histories. Although particular content is described, the present invention contemplates any suitable content.

In one embodiment, system 10 includes one or more user systems 12, sampling planner 14, sampling plan data 16, and generated content data 18. The components of system 10 are coupled to each other using one or more links, each of which includes one or more computer buses, local area networks (LANs), metropolitan area networks (MANs), wide area networks (WANs), portions of the Internet, or other wireline, optical, wireless, or other links. User systems 12 provide users access to sampling planner 14, enabling users to provide input to and receive output from sampling planner 14. Sampling planner 14 can, automatically or in response to input from one or more users, generate a sampling plan for testing generated content and, according to the generated sampling plan, extract one or more samples from the generated content for testing. To generate a sampling plan and extract one or more samples for testing, sampling planner 14 can use sampling plan data 16 and generated content data 18, as described more fully below. Sampling plan data 16 includes historical information regarding prior sampling plans, results achieved using prior sampling plans, and test results from prior tests conducted according to prior sampling plans. Generated content data 18 includes generated content, information regarding generated content (such as metadata associated with generated content), or both. In particular embodiments, sampling plan data 16, generated content data 18, or both can be stored in one or more tables in a database, such as a MICROSOFT ACCESS database. One or more applications for accessing sampling plan data 16, generated content data 18, or both can be written in VISUAL BASIC or another programming language. In particular embodiments, historical information is stored in one or more history tables organized according to batch name, data capture engineer, and class name. In particular embodiments, historical information is compiled from one or more MICROSOFT ACCESS databases having a VISUAL BASIC front-end (such as a visual information retrieval (VIR) database).

In one embodiment, sampling planner 14 includes process control unit 20, input module 22, sample plan module 24, and extraction module 26. The components of sampling planner 14 are coupled to each other using one or more links, each of which includes one or more computer buses, local area networks (LANs), metropolitan area networks (MANs), wide area networks (WANs), portions of the Internet, or other wireline, optical, wireless, or other links. Process control unit 20 controls the operation of sampling planner 14. As an example, process control unit 20 can communicate instructions to input module 22, sample plan module 24, and extraction module 26. As another example, process control unit 20 can facilitate communication among input module 22, sample plan module 24, and extraction module 26. As another example, process control unit 20 can request and receive information from sources external to sampling planner 14 and communicate the received information to input module 22, sample plan module 24, or extraction module 26, according to particular needs. Although a particular system 10 including particular components in a particular configuration is described and illustrated, the present invention contemplates any suitable system 10 including any suitable components in any suitable configuration.

Content can be categorized according to product lines. Reference to a "product line" encompasses content of a particular type. Examples of product lines include content generated for component databases, content generated for maintenance, repair, and operations (MRO) databases, content generated for supplier databases, and content generated for catalog databases. Reference to a "product" encompasses a particular instance of generated content. As an example, particular content corresponding to one or more particular components that has been generated by a content provider using particular information (such as information from one or more particular data books) could be a product. Different products of the same product line can share one or more characteristics. As an example, different records corresponding to different products of the same product line could all include information of the same type that has been formatted the same way and organized into the same fields.

A product can be organized into one or more lots (or batches) from which a sample can be drawn and tested to determine whether the lot is acceptable. If the number of errors identified in a sample drawn from a lot is at or below a certain threshold, the lot can be deemed acceptable. If, on the other hand, the number of errors identified in the sample exceeds the threshold, the lot can be deemed unacceptable. In particular embodiments, a sampling plan specifies the size of the sample drawn from the lot and the error threshold for determining whether the lot is acceptable. As described more fully below, sampling planner 14 can, automatically or in response to input from one or more user systems 12, generate a sampling plan for a lot and provide information that can be used to evaluate the effectiveness and efficiency of the generated sampling plan. Sampling planner 14 can also extract a sample from the lot for testing according to the generated sampling plan.

Certain quantifiable characteristics of a lot can be used to generate a sampling plan. Although particular characteristics of a particular lot that can be used to generate a sampling plan are described below, the present invention contemplates any suitable characteristics of any suitable lot being used to generate a sampling plan.

In particular embodiments, a lot includes multiple records that each include one or more fields. In these embodiments, the size of the lot can be represented by an N value for the lot. An N value for a lot is the product of the number of records in the lot and the number of fields in each record. For example, if a lot includes fifty records that each include ten fields, "500" is used as an N value for the lot.

The size of a sample drawn from the lot for testing is represented by an n value for the sample. An n value for a sample is the number of units of content (which could be records, fields, or other units of content) in the sample. For example, if seventeen fields are drawn from a lot, "17" is used as an n value for the sample drawn from the lot.

The number of errors in a sample is represented by an x value for the sample. For example, if four fields in a sample contain errors, "4" is used as an x value for the sample.

A c value for a sample represents the acceptance criterion for the lot from which the sample has been drawn, or the maximum number of errors the sample can contain without the lot being deemed unacceptable. For example, if "4" is used as a c value for the sample and the sample includes four errors, the lot is deemed acceptable. If, on the other hand, the sample includes five errors, the lot is deemed unacceptable.

The quality of a lot is represented by a p value for the lot. A p value can be stated as a percentage. For example, if a lot includes fifty records that each include ten fields and twenty-three of the fields contain errors, "0.046" can be used as a p value for the lot.

A $P_a$ value for a lot represents the probability that the lot will be deemed acceptable after a sample from the lot has been tested according to a sampling plan. In particular embodiments, $P_a$ can vary with respect to p.

A lot tolerance percent defective (LTPD) value for a lot represents a minimum level of lot quality that a consumer of the product can tolerate. An LTPD value for a lot corresponds to a p value for the lot at and above which the lot cannot be tolerated by the consumer. In particular embodiments, LTPD values are the same for different lots of the same product line. For example, "0.5" could be used as an LTPD value for different lots of the same product line. In particular embodiments, LTPD values are based on historical lot qualities and represent a low quality level for a product line. LTPD values can be held constant for a product line for a period of time. Although a particular LTPD value is described, the present invention contemplates any suitable LTPD value, according to particular needs.

A β value for a lot represents the probability that the lot, after a sample from the lot has been tested and the lot has been deemed acceptable, will not meet a minimum level of quality that the consumer can tolerate. In particular embodiments, a β value for a lot represents the consumer risk, or risk assumed by the consumer that the lot will be deemed acceptable but not meet the minimum level of quality that the consumer can tolerate. A β value for a lot corresponds to a $P_a$ value for the lot that, in turn, corresponds to an LTPD value for the lot. In particular embodiments, "0.1" is used as a β value for a lot. A β value of "0.1" represents a standard level of risk acceptable to some consumers. Although a particular β value is described, the present invention contemplates any suitable β value, according to particular needs. In particular embodiments, β and LTPD values for lots of the same product line can change as a result of one or more improvements in one or more processes used to generate lots of the product line.

An average total inspection (ATI) value for a lot represents the average number of units inspected per lot based on the sample size for accepted lots.

A P' value (or process average) for a lot reflects the impact that various constraints have had on the quality of products of the same product line in the past, such as the competency level of the personnel generating the product, the complexity of the product, the quality of the data source used to generate the product, and other constraints. In particular embodiments, a P' value for a lot is determined according to a P' value for a preceding lot of the same product line. As an example and not by way of limitation, a lot could be given a P' value corresponding to a P' value for the most recently sampled and tested lot of the same product line. In particular embodiments, a P' value for a lot is determined according to a moving average of P' values for multiple preceding lots of the same product line. As an example and not by way of limitation, a lot could be given a P' value that corresponds to an average P' value for the five most recently sampled and tested lots of the same product line. In particular embodiments, a P' value for a lot is determined according to a maximum P' value for multiple preceding lots of the same product line. As an example and not by way of limitation, a lot could be given a P' value that corresponds to a maximum P' value for the five most recently sampled and tested lots of the same product line. Although particular algorithms for determining particular P' values for particular lots of particular product lines are described, the present invention contemplates any suitable algorithm for determining any suitable P' value for any suitable lot of any suitable product line.

Figure 2:
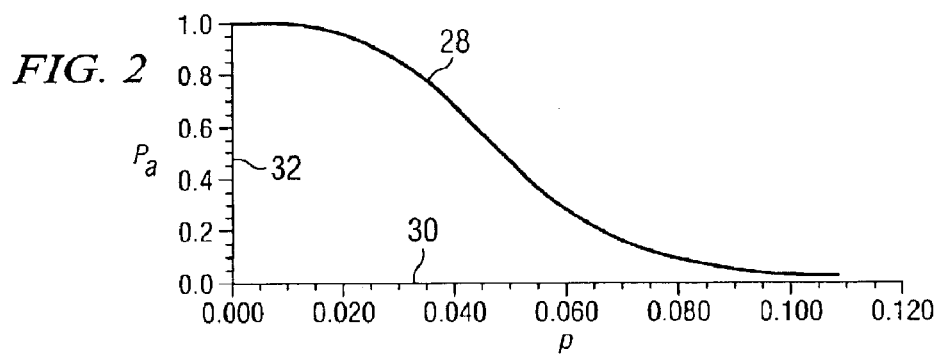
FIG. 2 illustrates an example operating characteristic (OC) curve for a sampling plan.

FIG. 2 illustrates an example operating characteristic (OC) curve 28 for a sampling plan. OC curve 28 can be used to evaluate the effectiveness and efficiency of a sampling plan. Horizontal axis 30 includes a range of p values for a lot, and vertical axis 32 includes a range of $P_a$ values for the lot. OC curve 28 represents the performance of the sampling plan across a range of lot qualities and can be used, in particular embodiments, to compare the cost of executing a sampling plan with the results the sampling plan could provide. The steepness of the OC curve can, in particular embodiments, indicate whether a larger or a smaller sample should be drawn from the lot for testing. Generally, if the OC curve is relatively steep, a relatively large sample should be drawn from the lot. If, on the other hand, the OC curve is relatively flat, a relatively small sample should be drawn from the lot. In particular embodiments, the fact that a substantial portion of the OC curve is separated from horizontal axis 30 by a relatively short distance could indicate that the lot has a relatively low β value and, therefore, that the sampling plan is more or less effective, efficient, or both. Generally, a relatively small n value is associated with a substantial portion of the OC curve being separated from horizontal axis 30 by a relatively short distance. In particular embodiments, the fact that a substantial portion of the OC curve is separated from horizontal axis 30 by a relatively long distance could indicate that the lot has a relatively high β value and, therefore, that the sampling plan is more or less ineffective, inefficient, or both. Generally, a relatively large n value is associated with a substantial portion of the OC curve being separated from horizontal axis 30 by a relatively long distance.

Figure 3:
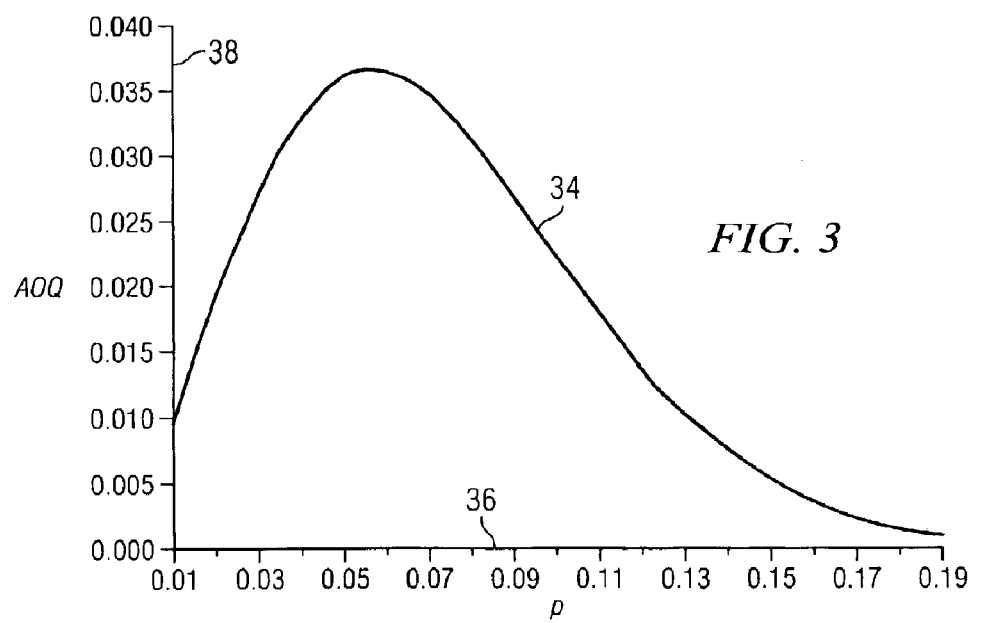
FIG. 3 illustrates an example average outgoing quality (AOQ) curve for a sampling plan.

FIG. 3 illustrates an example average outgoing quality (AOQ) curve 34 for a sampling plan. AOQ curve 34 can also be used to evaluate the effectiveness and efficiency of a sampling plan. Horizontal axis 36 includes a range of p values for a lot, and vertical axis 38 includes a range of AOQ values for the lot. An AOQ value for a lot represents the expected quality of the lot after a sample from the lot has been tested and the lot has been deemed acceptable. The average outgoing quality limit (AOQL) value for a lot represents a limiting p value for the lot according to a sampling plan and is a maximum AOQ value for the lot, according to the sampling plan, over all p levels for the lot. The AOQL value can represent a low quality level resulting from the sampling plan. A maximum AOQ value for a lot can reflect an AOQL value for one or more other lots tested according to the same sampling plan (but not necessarily with the same N and n values).

A distribution function can be used to generate a sampling plan specifying n and c values for a lot. The distribution function can also be used to generate OC and AOQ curves corresponding to the generated sampling plan for testing the lot. As described more fully below, a hypergeometric distribution function can be used to generate the sampling plan and corresponding OC and AOQ curves if the lot has an N value that is less than "161"; a binomial distribution function can be used if the lot has an N value that is between "160" and "351"; and a Poisson distribution function can be used if the lot has an N value that is greater than "350." Although particular distribution functions for generating particular sampling plans, particular OC curves, and particular AOQ curves for particular lots are described, the present invention contemplates any suitable distribution function for generating any suitable sampling plans, any suitable OC curves, and any suitable AOQ curves for any suitable lots.

If a lot has an N value that is less than "161," a hypergeometric distribution function can be used to generate a sampling plan for the lot and corresponding OC and AOQ curves for the lot according to the following algorithm. Using Equation 1, corresponding n values are calculated for a series of c values that start at "0" and increase incrementally by one.

$$P(x) = \frac{\frac{Np!}{(Np-x)!} * \frac{N(1-p)!}{(N(1-p)-(n-x))!}}{\frac{N!}{(N-n)!}} \quad (1)$$

P(x) is a probability function. For all real values of x, $0 \leq P(x) \leq 1$. The sum of all values of P(x) for all values of x is one. To calculate an n value corresponding to a c value, x is set to c, and p is set to an LTPD value for the lot. Because p is set to an LTPD value for the lot, P(x) is equal to a β value for the lot. As described above, constants such as "0.05" and "0.1" can be used as LTPD and β values, respectively.

For each pair of c and calculated n values, $P_a$ and ATI values are calculated using Equation 2 and Equation 3, respectively.

$$P_a = \sum_{x=0}^{x=c} \frac{\frac{Np!}{(Np-x)!} * \frac{N(1-p)!}{(N(1-p)-(n-x))!}}{\frac{N!}{(N-n)!}} \quad (2)$$

$$ATI = n(P_a) + (N-n)(1-P_a) \quad (3)$$

To calculate a $P_a$ value for a pair of c and n values, p is set to a P' value for the lot. As described above, in particular embodiments, a P' value for the lot can be determined according to a P' value for a preceding lot of the same product line, according to a moving average of P' values for multiple preceding lots of the same product line, or according to a maximum P' value for multiple preceding lots of the same product line. A $P_a$ value corresponding to a pair of c and n values can be used to calculate an ATI value for the pair of c and n values.

In particular embodiments, a complete set of corresponding c, n, $P_a$, and ATI values is generated before a subsequent set of corresponding c, n, $P_a$, and ATI values is generated. As an example and not by way of limitation, in these embodiments, c is set to "0," and corresponding n, $P_a$, and ATI values are calculated; c is then set to "1.0," and corresponding n, $P_a$, and ATI values are calculated; c is then set to "2.0," and corresponding n, $P_a$, and ATI values are calculated; and so on. In particular embodiments, sets of corresponding c, n, $P_a$, and ATI values are generated until a minimum ATI value is calculated. As c values are increased from "0," calculated ATI values decrease, reach a minimum ATI value, and then increase from the minimum ATI value. To determine whether a minimum ATI value has been calculated, ATI values can be monitored as they are calculated and, when calculated ATI values begin to increase, the lowest ATI value that has been calculated can be used as a minimum ATI value for the lot. An example and not by way of limitation, if ATI values of "1000," "900," "700," and "721" are calculated, "700" can be used as a minimum ATI value. The n and c values corresponding to the minimum ATI value are used as the n and c values of the generated sampling plan.

In particular embodiments, the n and c values corresponding to the minimum ATI value are used to calculate $P_a$ (using Equation 2) for a series of p values that start at "0" and increase incrementally by an amount, such as "0.01," "0.001," or another amount. $P_a$ can be plotted against p using the calculated $P_a$ values to generate an OC curve corresponding to the generated sampling plan. In particular embodiments, using Equation 4 and the n value corresponding to the minimum ATI value, an AOQ value is calculated for each pair of p and $P_a$ values.

$$AOQ = \frac{N-n}{N} * p * P \quad (4)$$

AOQ can then plotted against p using the calculated AOQ values to generate an AOQ curve corresponding to the generated sampling plan. The maximum calculated AOQ value can be used as an AOQL value for the lot.

If a lot has an N value that is between "160" and "351," a binomial distribution function can be used to generate a sampling plan for the lot and corresponding OC and AOQ curves according to the following algorithm., Using Equation 5, corresponding n values are calculated for a series of c values that start at "0" and increase incrementally by one.

$$P(x) = \left(\frac{n!}{(n-x)!}\right) * p * x * (1-p) * (n-x) \quad (5)$$

P(x) is a probability function. For all real values of x, $0 \leq P(x) \leq 1$. The sum of all values of P(x) for all values of x is one. To calculate an n value corresponding to a c value, x is set to c, and p is set to an LTPD value for the lot. Because p is set to an LTPD value for the lot, P(x) is equal to a β value for the lot. As described above, constants such as "0.05" and "0.1" can be used as LTPD and β values, respectively.

For each pair of c and calculated n values, $P_a$ and ATI values are calculated using Equation 6 and Equation 3, respectively:

$$P_a = \sum_{x=0}^{x=c} \left(\frac{n!}{(n-x)!}\right) * p * x * (1-p) * (n-x) \quad (6)$$

To calculate a $P_a$ value for a pair of c and n values, p is set to a P' value for the lot. As described above, in particular embodiments, a P' value for the lot can be determined according to a P' value for a preceding lot of the same product line, according to a moving average of P' values for multiple preceding lots of the same product line, or according to a maximum P' value for multiple preceding lots of the same product line. A $P_a$ value corresponding to a pair of c and n values can be used to calculate an ATI value for the pair of c and n values.

In particular embodiments, as described above, a complete set of corresponding c, n, $P_a$, and ATI values is generated before a subsequent set of corresponding c, n, $P_a$, and ATI values is generated. In particular embodiments, as described above, sets of corresponding c, n, $P_a$, and ATI values are generated until a minimum ATI value is calculated. The n and c values corresponding to the minimum ATI value are used as the n and c values of the generated sampling plan.

In particular embodiments, the n and c values corresponding to the minimum ATI value are used to calculate $P_a$ (using Equation 6) for a series of p values that start at "0" and increase incrementally by an amount, such as "0.01," "0.001," or another amount. $P_a$ can be plotted against p using the calculated $P_a$ values to generate an OC curve corresponding to the generated sampling plan. In particular embodiments, using Equation 4 and the n value corresponding to the minimum ATI value, an AOQ value is calculated for each pair of p and $P_a$ values. AOQ can be plotted against p using the calculated AOQ values to generate an AOQ curve corresponding to the generated sampling plan. The maximum calculated AOQ value can be used as the AOQL value for the lot.

If a lot has an N value that is greater than "350," a Poisson distribution function can be used to generate a sampling plan for the lot and corresponding OC and AOQ curves according, to the following algorithm. Using Equation 7, corresponding n values are calculated for a series of c values that start at "0" and increase incrementally by one.

$$P(x) = \frac{(e-\lambda) * \lambda}{x!} \quad (7)$$

P(x) is a probability function. For all real values of x, $0 \leq P(x) \leq 1$. The sum of all values of P(x) for all values of x is one. e is the natural logarithmic base, and λ=n*p. To calculate an n value corresponding to a c value, x is set to c, and p is set to an LTPD value for the lot. Because p is set to an LTPD value for the lot, P(x) is equal to a β value for the lot. As described above, constants such as "0.05" and "0.1" can be used as LTPD and β values, respectively.

For each pair of c and calculated n values, $P_a$ and ATI values are calculated using Equation 8 and Equation 9, respectively.

$$P_a = \sum_{x=0}^{x=c} \frac{(e-\lambda)*\lambda}{x!} \qquad (8)$$

As described above, e is the natural logarithmic base, and λ=n*p. To calculate a $P_a$ value for a pair of c and n values, p is set to a P' value for the lot. As described above, in particular embodiments, a P' value for the lot can be determined according to a P' value for a preceding lot of the same product line, according to a moving average of P' values for multiple preceding lots of the same product line, or according to a maximum P' value for multiple preceding lots of the same product line. A $P_a$ value corresponding to a pair of c and n values can be used to calculate an ATI value for the pair of c and n values.

In particular embodiments, as described above, a complete set of corresponding c, n, $P_a$, and ATI values is generated before a subsequent set of corresponding c, n, $P_a$, and ATI values is generated. In particular embodiments, as described above, sets of corresponding c, n, $P_a$, and ATI values are generated until a minimum ATI value is calculated. The n and c values corresponding to the minimum ATI value are used as the n and c values of the generated sampling plan.

In particular embodiments, the n and c values corresponding to the minimum ATI value are used to calculate $P_a$ (using Equation 8) for a series of p values that start at "0" and increase incrementally by an amount, such as "0.01," "0.001," or another amount. $P_a$ can be plotted against p using the calculated $P_a$ values to generate an OC curve corresponding to the generated sampling plan. In particular embodiments, using Equation 4 and the n value corresponding to the minimum ATI value, an AOQ value is calculated for each pair of p and $P_a$ values. AOQ can be plotted against p using the calculated AOQ values to generate an AOQ curve corresponding to the generated sampling plan. The maximum calculated AOQ value can be used as the AOQL value for the lot.

In particular embodiments, input module 22 generates input that can be used in the algorithms described above for generating a sampling plan for a lot and corresponding OC and AOQ curves. As an example, input module 22 can access sampling plan data 16 and generated content data 18 and, using the accessed data, determine N, LTPD, β, and P' values for the lot. Input module 22 can be customized to generate input corresponding to lots of a particular product line. Sample plan module 24 can, using N, LTPD, β, and P' values for the lot, generate the sampling plan and the corresponding OC and AOQ curves. The generated sampling plan and the corresponding OC and AOQ curves can be communicated to one or more user systems 12 to enable one or more users to execute the generated sampling plan and to evaluate its effectiveness and efficiency. Sample plan module 22 can be coded using Perl or another programming language. In particular embodiments, input module 22 includes a configuration file that can be used to temporarily store determined N, LTPD, β, and P' values for the lot.

Extraction module 26 can, using an n value, access generated content data 18 and extract a sample from the lot for testing according to the generated sampling plan. The extracted sample can be communicated to one or more user systems for manual testing, automated testing, or a combination of manual and automated testing according to the generated sampling plan. As described above, the extracted sample can include one or more content units. In particular embodiments, to extract the sample, extraction module 26 uses a stratified random sample extraction algorithm that has been customized for extracting samples from products of the product line of the lot. Stratification is the process of categorizing information with respect to one or more characteristics. As an example, extraction module 26 can extract a sample according to an n value and stratify, or categorize, the extracted sample with respect to one or more characteristics of the lot from which the sample has been extracted. In particular embodiments, characteristics according to which a sample can be stratified include a manufacturer code that identifies manufacturer catalogs and other characteristics. Extraction module 26 can be customized to extract samples from lots of a particular product line. Extraction module 26 can be coded using Perl or another programming language.

Figure 4:
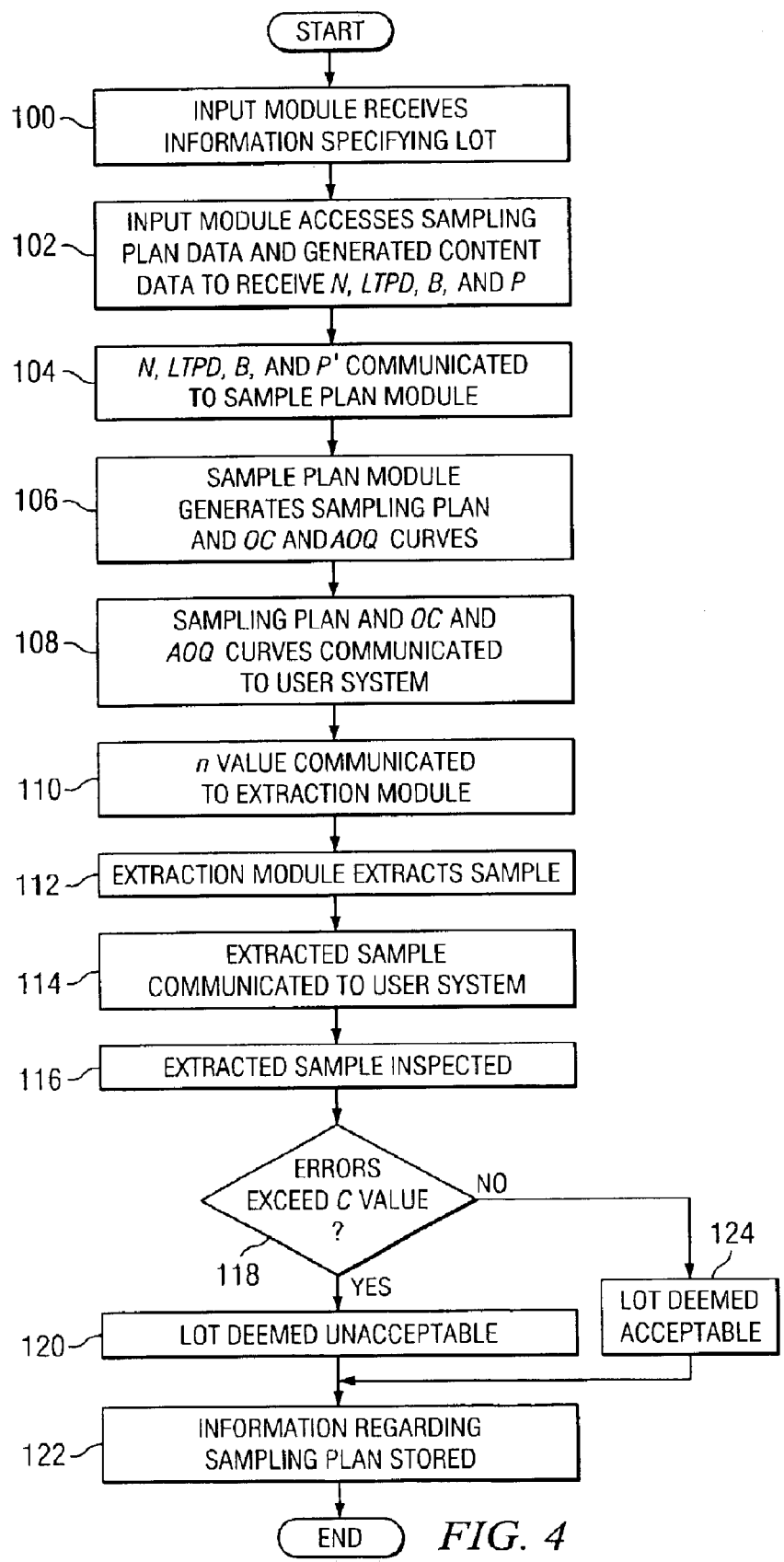
FIG. 4 illustrates an example method for generating a sampling plan for testing generated content.

FIG. 4 illustrates an example method for generating a sampling plan for testing generated content. The method begins at step 100, where input module 22 receives information from a user system 12 specifying a lot. At step 102, input module 22 accesses sampling plan data 16 and generated content data 18 to receive N, LTPD, β, and P' values for the specified lot as input. At step 104, the determined N, LTPD, β, and P' values are communicated to sample plan module 24. At step 106, sample plan module 24 generates a sampling plan (which specifies n and c values for the lot) and OC and AOQ curves corresponding to the sampling plan. At step 108, the generated sampling plan and OC and AOQ curves are communicated from sampling planner 14 to user system 12. As described above, the generated OC and AOQ curves can be used to evaluate the effectiveness and efficiency of the generated sampling plan. At step 110, the generated n value is communicated from sampling planner 14 to extraction module 26, along with information specifying the lot. At step 112, extraction module 26 accesses generated content data 18 and extracts a sample from the lot according to the generated n value. At step 114, the extracted sample is communicated from sampling planner 14 to user system 12.

At step 116, at user system 12, the extracted sample is inspected to determine how many errors the sample contains. The received sample can be inspected manually, automatically, or using a combination of manual steps and one or more automatic processes. At step 118, if the determined number of errors in the sample exceeds the c value specified in the generated sampling plan, the method proceeds to step 120. At step 120, the lot is deemed unacceptable. At step 122, information regarding the sampling plan is stored as sampling plan data 16, at which point the method ends. In particular embodiments, the stored information includes the input used to generate the sampling plan (which includes the N, LTPD, β, and P' for the lot), the sampling plan (which includes the n and c values for the lot), and the test results. As described above, sampling plan data 16 can be used to generate subsequent sampling plans. Returning to step 118, if the determined number of errors in the sample does not exceed the c value specified in the generated sampling plan, the method proceeds to step 124. At step 124, the lot is deemed acceptable, and the method proceeds to step 122. In particular embodiments, if the lot is deemed acceptable, the lot is released for further processing. Although particular steps of the method described above are described and illustrated as occurring in a particular order, the present invention contemplates any suitable steps of the method described above occurring in any suitable order.

Although particular embodiments of the present invention have been described and illustrated, sundry changes, substitutions, variations, alterations, or modifications can be suggested,to one skilled in the art, and it is intended that the present invention encompass all changes, substitutions, variations, alterations, and modifications that fall within the spirit and scope of the appended claims.

What is claimed is:

1. A system for generating a sampling plan for testing generated content, the system comprising:
    an input module operable to generate input to a sample plan module, the input being usable to generate a sampling plan for testing a lot and comprising:
        information reflecting a size of the lot;
        information reflecting a minimum level of lot quality that a consumer can tolerate;
        information reflecting a probability that the lot will not meet the minimum level of lot quality that the consumer can tolerate; and
        information reflecting one or more constraints that have historically affected lot quality; and
    the sample plan module, operable to:
        receive the generated input; and
        according to the received input and a distribution function corresponding to the size of the lot:
            generate a sampling plan specifying a sample size and one or more acceptance criteria; and
            generate information for evaluating the effectiveness and efficiency of the generated sampling plan.

2. The system of claim 1, further comprising an extraction module operable to extract one or more samples from the lot according to the generated sampling plan.

3. The system of claim 2, wherein the extraction module is further operable to stratify the one or more extracted samples according to one or more characteristics of the lot.

4. The system of claim 1, wherein:
    if the size of the lot is within a first range of sizes, the distribution function comprises a hypergeometric distribution function;
    if the size of the lot is within a second range of sizes, the distribution function comprises a binomial distribution function; and
    if the size of the lot is within a third range of sizes, the distribution function comprises a Poisson distribution function.

5. The system of claim 4, wherein:
    every size within the first range of sizes is smaller than every size within the second range of sizes; and
    every size within the second range of sizes is smaller than every size within the third range of sizes.

6. The system of claim 1, wherein the one or more constraints that have historically affected lot quality comprise one or more of:
    competency level of personnel who have produced the lot;
    lot complexity; and
    quality of one or more data sources used to produce the lot.

7. The system of claim 1, wherein an acceptance criterion specified in the generated sampling plan comprises a maximum number of errors allowed.

8. The system of claim 1, wherein the information for evaluating the effectiveness and efficiency of the generated sampling plan comprises:
    a first curve reflecting performance of the generated sampling plan over a range of lot qualities; and
    a second curve reflecting expected lot quality after a sample from the lot has been tested according to the generated sampling plan and the lot has been deemed acceptable.

9. The system of claim 1, wherein the lot comprises commerce content, technical content, or knowledge content.

10. A method for generating a sampling plan for testing generated content, the method comprising:
    generating input, the input being usable to generate a sampling plan for testing a lot and comprising:
        information reflecting a size of the lot;
        information reflecting a minimum level of lot quality that a consumer can tolerate;
        information reflecting a probability that the lot will not meet the minimum level of lot quality that the consumer can tolerate; and
        information reflecting one or more constraints that have historically affected lot quality; and
    according to the received input and a distribution function corresponding to the size of the lot:
        generating a sampling plan specifying a sample size and one or more acceptance criteria; and
        generating information for evaluating the effectiveness and efficiency of the generated sampling plan.

11. The method of claim 10, further comprising extracting one or more samples from the lot according to the generated sampling plan.

12. The method of claim 11, further comprising stratifying the one or more extracted samples according to one or more characteristics of the lot.

13. The method of claim 10, wherein:
    if the size of the lot is within a first range of sizes, the distribution function comprises a hypergeometric distribution function;
    if the size of the lot is within a second range of sizes, the distribution function comprises a binomial distribution function; and
    if the size of the lot is within a third range of sizes, the distribution function comprises a Poisson distribution function.

14. The method of claim 13, wherein:
    every size within the first range of sizes is smaller than every size within the second range of sizes; and
    every size within the second range of sizes is smaller than every size within the third range of sizes.

15. The method of claim 10, wherein the one or more constraints that have historically affected lot quality comprise one or more of:
    competency level of personnel who have produced the lot;
    lot complexity; and
    quality of one or more data sources used to produce the lot.

16. The method of claim 10, wherein an acceptance criterion specified in the generated sampling plan comprises a maximum number of errors allowed.

17. The method of claim 10, wherein the information for evaluating the effectiveness and efficiency of the generated sampling plan comprises:
    a first curve reflecting performance of the generated sampling plan over a range of lot qualities; and a second curve reflecting expected lot quality after a sample from the lot has been tested according to the generated sampling plan and the lot has been deemed acceptable.

18. The method of claim 10, wherein the lot comprises commerce content, technical content, or knowledge content.

19. Software for generating a sampling plan for testing generated content, the software embodied in media and when executed using one or more computer systems operable to:
  generate input, the input being usable to generate a sampling plan for testing a lot and comprising:
    information reflecting a size of the lot;
    information reflecting a minimum level of lot quality that a consumer can tolerate;
    information reflecting a probability that the lot will not meet the minimum level of lot quality that the consumer can tolerate; and
    information reflecting one or more constraints that have historically affected lot quality; and
  according to the received input and a distribution function corresponding to the size of the lot:
    generate a sampling plan specifying a sample size and one or more acceptance criteria; and
    generate information for evaluating the effectiveness and efficiency of the generated sampling plan.

20. The software of claim 19, further operable to extract one or more samples from the lot according to the generated sampling plan.

21. The software of claim 20, further operable to stratify the one or more extracted samples according to one or more characteristics of the lot.

22. The software of claim 19, wherein:
  if the size of the lot is within a first range of sizes, the distribution function comprises a hypergeometric distribution function;
  if the size of the lot is within a second range of sizes, the distribution function comprises a binomial distribution function; and
  if the size of the lot is within a third range of sizes, the distribution function comprises a Poisson distribution function.

23. The software of claim 22, wherein:
  every size within the first range of sizes is smaller than every size within the second range of sizes; and
  every size within the second range of sizes is smaller than every size within the third range of sizes.

24. The software of claim 19, wherein the one or more constraints that have historically affected lot quality comprise one or more of:
  competency level of personnel who have produced the lot;
  lot complexity; and
  quality of one or more data sources used to produce the lot.

25. The software of claim 19, wherein an acceptance criterion specified in the generated sampling plan comprises a maximum number of errors allowed.

26. The software of claim 19, wherein the information for evaluating the effectiveness and efficiency of the generated sampling plan comprises:
  a first curve reflecting performance of the generated sampling plan over a range of lot qualities; and
  a second curve reflecting expected lot quality after a sample from the lot has been tested according to the generated sampling plan and the lot has been deemed acceptable.

27. The software of claim 19, wherein the lot comprises commerce content, technical content, or knowledge content.

28. A system for generating a sampling plan for testing generated content, the system comprising:
  an input module operable to generate input to a sample plan module, the input being usable to generate a sampling plan for testing a lot and comprising:
    information reflecting a size of the lot;
    information reflecting a minimum level of lot quality that a consumer can tolerate;
    information reflecting a probability that the lot will not meet the minimum level of lot quality that the consumer can tolerate; and
    information reflecting one or more constraints that have historically affected lot quality, the one or more constraints comprising one or more of competency level of personnel who have produced the lot, lot complexity, and quality of one or more data sources used to produce the lot;
  the sample plan module, operable to:
    receive the generated input; and
    according to the received input and, depending on the size of the lot, either a hypergeometric distribution function, a binomial distribution function, or a Poisson distribution function:
      generate a sampling plan specifying a sample size and one or more acceptance criteria; and
      generate information for evaluating the effectiveness and efficiency of the generated sampling plan, the information comprising:
        a first curve reflecting performance of the generated sampling plan over a range of lot qualities; and
        a second curve reflecting expected lot quality after a sample from the lot has been tested according to the generated sampling plan and the lot has been deemed acceptable; and
  an extraction module, operable to:
    extract one or more samples from the lot according to the generated sampling plan; and
    stratify the one or more extracted samples according to one or more characteristics of the lot.

29. A system for generating a sampling plan for testing generated content, the system comprising:
  means for generating input, the input being usable to generate a sampling plan for testing a lot and comprising:
    information reflecting a size of the lot;
    information reflecting a minimum level of lot quality that a consumer can tolerate;
    information reflecting a probability that the lot will not meet the minimum level of lot quality that the consumer can tolerate; and
    information reflecting one or more constraints that have historically affected lot quality; and
  means for, according to the received input and a distribution function corresponding to the size of the lot:
    generating a sampling plan specifying a sample size and one or more acceptance criteria; and
    generating information for evaluating the effectiveness and efficiency of the generated sampling plan.

* * * * *